(12) United States Patent
Mendes (10) Patent No.: US 11,229,169 B2
(45) Date of Patent: Jan. 25, 2022

(54) HYDROPONIC GROWTH SYSTEM

(71) Applicant: The Green Room L.L.C., Saugatuck, MI (US)

(72) Inventor: Adam Mendes, Saugatuck, MI (US)

(73) Assignee: The Green Room L.L.C., Saugatuck, MI (US)

( * ) Notice: Subject to any disclaimer, the term of this patent is extended or adjusted under 35 U.S.C. 154(b) by 177 days.

(21) Appl. No.: 16/519,532

(22) Filed: Jul. 23, 2019

(65) Prior Publication Data
US 2020/0022323 A1    Jan. 23, 2020

Related U.S. Application Data

(60) Provisional application No. 62/702,155, filed on Jul. 23, 2018.

(51) Int. Cl.
*A01G 31/02* (2006.01)
*A01G 27/00* (2006.01)
*A01G 31/00* (2018.01)

(52) U.S. Cl.
CPC .......... *A01G 31/02* (2013.01); *A01G 27/005* (2013.01); *A01G 2031/006* (2013.01)

(58) Field of Classification Search
CPC .............. A01G 31/02; A01G 2031/006; A01G 27/005; A01G 27/006
USPC ...................................................... 47/59 R
See application file for complete search history.

(56) References Cited

U.S. PATENT DOCUMENTS

| 4,118,891 A | 10/1978 | Kehl et al. |
| 4,170,844 A | 10/1979 | Steele |
| 4,255,896 A | 3/1981 | Carl |
| 4,630,394 A | 12/1986 | Sherard |
| 4,860,490 A | 8/1989 | Morris et al. |

(Continued)

FOREIGN PATENT DOCUMENTS

| JP | 2007306895 A | 11/2007 |
| JP | 5246576 B2 | 7/2013 |

(Continued)

OTHER PUBLICATIONS

Making and Deploying a Check Valve for a Hydroponics Multi-Tier Flood-and-Drain Rig, accessed online at https://www.instructables.com/id/Making-and-Deploying-a-Check-Valve-for-a-Hydroponi/ on May 11, 2018.

*Primary Examiner* — Brady W Frazier
(74) *Attorney, Agent, or Firm* — Varnum, Riddering, Schmidt & Howlett LLP (57) ABSTRACT

A hydroponic growth system for plant growth is disclosed. The hydroponic growth system comprises a nutrient reservoir for containing a nutrient solution, and a plurality of growth vessels. The hydroponic growth system further comprises a nutrient delivery system for delivering the nutrient solution from the nutrient reservoir to the growth vessels. The nutrient delivery system comprises at least one water pump, a first liquid tube, and a second liquid tube, and each of the liquid tubes being connected to and in fluid communication with a water growth vessel at a first end, and being connected to and in fluid communication with a respective pump at a second end. The hydroponic growth system further includes an overflow tube extending between a first one of the growth vessels and a second one of the growth vessels.

20 Claims, 10 Drawing Sheets

(56) References Cited

U.S. PATENT DOCUMENTS

| | | | |
|---|---|---|---|
| 5,501,037 A | | 3/1996 | Aldokimov et al. |
| 6,105,309 A | * | 8/2000 | Takayanagi ............ A01G 31/02 47/62 R |
| 6,293,048 B1 | | 9/2001 | Boulter et al. |
| 9,730,398 B2 | | 8/2017 | Halmos et al. |
| 2011/0308153 A1 | * | 12/2011 | Jones ................... A01G 27/005 47/65.8 |
| 2017/0105368 A1 | | 4/2017 | Mehrman |
| 2018/0035626 A1 | | 2/2018 | Bailey |

FOREIGN PATENT DOCUMENTS

| | | |
|---|---|---|
| JP | 6013724 B2 | 10/2016 |
| WO | 2018092142 A1 | 5/2018 |

\* cited by examiner

HYDROPONIC GROWTH SYSTEM

CROSS REFERENCE TO RELATED APPLICATION

This application claims the benefit of U.S. Provisional Application 62/702,155, which was filed on Jul. 23, 2018, the disclosure of which is hereby incorporated by reference.

BACKGROUND OF THE INVENTION

1. Field of the Invention

The present invention pertains to hydroponic farming. More particularly, the present invention pertains to a hydroponic growth system providing means for supplying nutrient solution between various growth vessels.

2. Description of the Prior Art

Hydroponic growth systems can employ one or more growth vessels in which plants are contained. The vessels typically contain a growth medium for supporting the growth of plant roots. Each of the one or more growth vessels is supplied with a liquid nutrient solution that provides both the nutrients and water needed for the plants contained in the growth vessels to grow. The nutrient solution is generally supplied in such a manner that the roots of the plant are sufficiently aerated to prevent the plants from drowning. Typically pumps are employed to cause the flow of the nutrient solution from a nutrient reservoir to each of the growth vessels.

Generally, in conventional hydroponic systems, it is required to implement a complex control system which can monitor the supply of the nutrient solution in each of the growth vessels, and prevent oversupply or overflow of the nutrient solution therein. The control system may require installation of multiple sensors, for example a nutrient solution level sensor in each of the growth vessels, and further a controller which can communicate with the one or more pumps when to stop the supply of the nutrient solution. Such control system, with multiple sensors and controllers, may significantly increase the cost of installing a hydroponic growth system. In addition, the multiple sensors can be subject to failure through either mechanical degradation due to repeated use, or from interference or entanglement with the plant's roots. Failure of a nutrient solution level sensor can be detrimental and potentially result in an overflow of the nutrient solution and/or a drowning of the plant's roots.

Thus, there remains a need for a hydroponic growth system that avoids the deficiencies of the conventional systems, and provides simpler and more cost-effective means for solving the problem of overflow of nutrient solutions from the growth vessels therein. The present invention, as detailed herein below, seeks to fill this need by providing a hydroponic growth system which is cost-effective and can be easily installed and overcome the said problems associated with the conventional systems.

SUMMARY OF THE INVENTION

The present invention provides a hydroponic growth system. The hydroponic growth system comprises a nutrient reservoir for containing a nutrient solution. The hydroponic growth system also comprises a plurality of growth vessels. The hydroponic growth system further comprises a nutrient delivery system for delivering the nutrient solution from the nutrient reservoir to the growth vessels. The nutrient delivery system comprises a first water pump, a second water pump, a first liquid tube, and a second liquid tube, and each of the liquid tubes being connected to and in fluid communication with a respective growth vessel at a first end, and being connected to and in fluid communication with a respective one of the water pumps at a second end, whereby the water pumps are configured to pump nutrient solution from the nutrient reservoir to the growth vessels. The hydroponic growth system further comprises an overflow tube extending between a first one of the growth vessels and a second one of the growth vessels.

Optionally, the overflow tube extends into the second growth vessel and includes a plurality of openings for dispersing nutrient solution from the first growth vessel.

Additionally, the hydroponic growth system can include an air stone positioned within at least one of the growth vessels, an air pump, and an air tube for delivering pumped air from the air pump to the air stone.

Optionally, the water pumps are positioned within the nutrient reservoir.

Additionally, the growth vessels optionally contain a growth medium, wherein the growth medium is selected from the group consisting of: expanded clay pebbles, peat moss, coco coir (which is derived from coconut husks), gravel, rockwool, sand, perlite, vermiculite, diatomite, glass, hydropeat, and combinations thereof.

For a more complete understanding of the present invention, reference is made to the following detailed description and accompanying drawings. In the drawings, like reference characters refer to like parts throughout the views in which:

DETAILED DESCRIPTION OF THE PREFERRED EMBODIMENT

Figure 1:
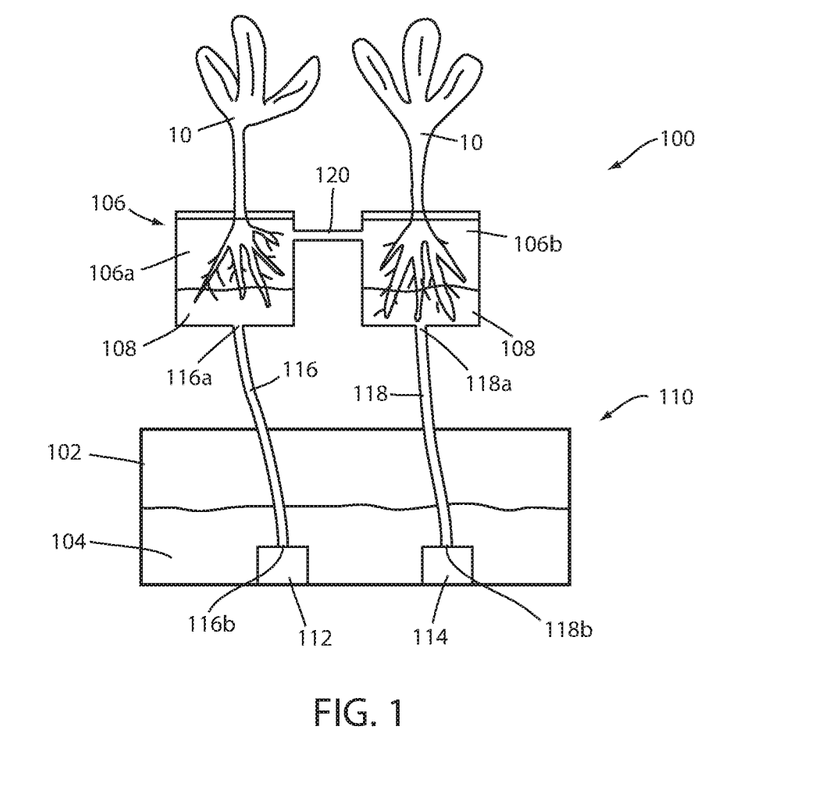
FIG. 1 is a schematic view of a hydroponic growth system of the present invention, in accordance with a first embodiment.

In accordance with the present invention and as shown generally in FIGS. 1-2, there is provided a hydroponic growth system 100 (hereinafter, sometimes simply referred to as "system 100"). The hydroponic growth system 100 is an irrigation system in which plants' roots receive a balanced nutrient solution dissolved in water with all the chemical elements needed for plant growth, which can grow directly on the mineral solution, or in an inert medium or substrate. Herein, "hydroponics" is the technique of growing any plant without implanting it in soil, and is considered, generally, a subset of hydroculture which is the method of growing plants without soil, using mineral nutrient solutions in a water solvent.

As illustrated, the hydroponic growth system 100 of the present disclosure includes a nutrient reservoir 102 for containing a nutrient solution 104. The nutrient reservoir 102 holds a reserve of the nutrient solution 104 that, typically, includes water and a soluble nutrient. The hydroponic growth system 100 also includes a plurality of growth vessels 106, including at least a first growth vessel 106a and a second growth vessel 106b. Each of the growth vessels 106 supports one or more plants 10 therein. The nutrient reservoir 102 is provided to serve as a tank to hold the nutrient solution 104 for supply to the growth vessels 106. Preferably, the capacity of the nutrient reservoir 102 to hold the nutrient solution 104 should be greater than the combined capacity of the plurality of growth vessels 106 irrigated by the present system 100.

Preferably, the growth vessels 106 are a growth pot, or bucket, having a closed bottom and side walls, and having an open top. The growth vessels 106 are plumbed for connection with the various liquid tubes and overflow tube, as described in greater detail below.

Alternatively, a "bubble bucket" configuration can be used in which the growth vessels 106 include a lid that has a downwardly extending basket (not shown) which includes openings, such as slots or holes. The basket is filled with a medium, such as clay pebbles, for holding the plant 10 in place. The roots of the plant extend through the openings in the basket, and then grow down into the growth vessel 106.

Further, each of the growth vessels 106 contains a growth medium 108 which supports the plants 10 (and primarily the plants' roots) being grown in the corresponding growth vessels 106. The growth medium 108 generally have a particle size of at least ⅛ inch (3 mm) to support the plant 10 therein. In the present examples, the growth medium 108 is a conventional growth medium and selected from the group consisting of: expanded clay pebbles, peat moss, coco coir (which is derived from coconut husks), gravel, rockwool, sand, perlite, vermiculite, diatomite, glass, hydropeat, and combinations thereof.

Further, as illustrated, the hydroponic growth system 100 includes a nutrient delivery system 110 for delivering the nutrient solution 104 from the nutrient reservoir 102 to the growth vessels 106. In particular, the nutrient delivery system 110 includes at least a first water pump 112 and a second water pump 114. In the nutrient delivery system 110, the water pumps 112 and 114 are configured to pump the nutrient solution 104 from the nutrient reservoir 102 to the growth vessels 106. The nutrient delivery system 110 also includes a first liquid tube 116 and a second liquid tube 118. Each of the liquid tubes 116 and 118 are connected to and in fluid communication with a respective growth vessel 106 and with a respective water pump 112 or 114. For instance, the first liquid tube 116 may be connected to the first growth vessel 106a at a first end 116a, and being connected to and in fluid communication with the first water pump 112 at a second end 116b. Similarly, the second liquid tube 118 may be connected to the second growth vessel 106b at a first end 118a, and being connected to and in fluid communication with the second water pump 114 at a second end 118b. In one example, the liquid tubes 116 and 118 are food and beverage grade flexible polymer tubing as known in the art.

In the nutrient delivery system 110, the first water pump 112 and the second water pump 114 may be operated in either a supply mode or a return mode. In the supply mode, the pumps 112 and 114 are energized to pump the nutrient solution 104 through the respective liquid tubes 116 and 118 in a supply direction, from their second ends 116b and 118b to their first ends 116a and 118a, thereby supplying the nutrient solution 104 from the nutrient reservoir 102 to the growth vessels 106a and 106b, respectively. In the return mode, the pumps 112 and 114 allow return of the nutrient solution 104 in a return direction, from their first ends 116a and 118a to their second ends 116b and 118b, thereby draining the growth vessels 106a and 106b and returning the nutrient solution 104 to the nutrient reservoir 102. It may be understood that the return mode of the pumps 112 and 114 may be either passive or active. When the nutrient reservoir 102 is located below the level of all the growth vessels 106, the liquid tubes 116 and 118 permit drainage of the nutrient solution 104 down into the nutrient reservoir 102 through the pumps 112 and 114 while passive in return mode under the influence of gravity. This passive return mode allows single-direction pumps to be employed, and reduces energy consumption since the pumps are only energized in their supply mode of operation.

As discussed, generally, the growth vessels 106 are positioned at a higher elevation than the nutrient reservoir 102. The height is selected relative to the length of the liquid tubes 116 and 118 which connect the nutrient reservoir 102 to the growth vessels 106, such that the weight of liquid in the portion of the liquid tubes 116 and 118 leading up from the growth vessels 106 up to the highest point in the liquid tubes 116 and 118 is less than the weight of the liquid in the remaining portion of the liquid tubes 116 and 118, leading down to the nutrient reservoir 102, in order to provide the gravitational force to sustain the siphon when draining the growth vessels 106.

Alternatively, and preferably, the first ends 116a and 118a are secured to a bottom surface of the respective growth vessels 106 to permit drainage of the vessel 106 without necessarily creating a siphon in the liquid tubes 116 or 118. As shown in the illustrated examples, the first water pump 112 and the second water pump 114 are placed inside the nutrient reservoir 102 itself. For this purpose, the water pumps 112 and 114 may be a submersion-type pump, as are well known in the art. In one exemplary configuration, the water pumps 112 and 114 in the nutrient reservoir 102 are preferably brush-less DC motorized centrifugal type pumps. It may be contemplated that, in an alternate embodiment, only one water pump may be employed to supply the nutrient solution 104 to all the growth vessels 106 without any limitations. Preferably the single water pump selectively pumps nutrient solution 104 to the vessels 106a and 106b via the liquid tubes 116 and 118 using a valve system (not shown).

Referring back to the first embodiment hereof, the hydroponic growth system 100 of the present disclosure further includes an overflow tube 120 extending between the first growth vessel 106a and the second growth vessel 106b. The overflow tube 120 may dispose the first growth vessel 106a and the second growth vessel 106b in fluid communication with each other, such that any excess level of the nutrient solution 104 from any one of the first growth vessel 106a and the second growth vessel 106b may be supplied to the other of the two vessels 106a and 106b. The overflow tube 120 may be a regular tube or pipe of suitable length required to connect the two vessels 106a and 106b arranged in the hydroponic growth system 100. As shown in the drawings, the overflow tube 120 is preferably secured to an upper portion of a sidewall of each vessel 106a and 106b. And as also shown throughout the drawings, the overflow tube 120 is preferably secured to the first growth vessel 106a and the second growth vessel 106b at substantially the same vertical height or elevation on each of first and second growth vessels 106a, 106b. The level at which the overflow tube 120 may be connected with any of the first growth vessel 106a and the second growth vessel 106b may be determined based on the level of the nutrient solution 104 required for the plant 10 being planted in that particular growth vessel.

In use of the present hydroponic growth system 100, the water pumps 112 and 114 are selectively energized one at a time such that the nutrient solution 104 is pumped from the nutrient reservoir 102 to either of the growth vessels 106a or 106b, raising the depth of the nutrient solution 104 in that particular growth vessel until such predetermined time has expired when the water pump is turned off, such as by use of a timer or microcontroller (not shown). If the nutrient solution 104 reaches the specified maximum height in the growth vessel 106, the excess nutrient solution 104 from saturated growth vessel 106 starts to flow via the overflow tube 120 to the correspondingly connected growth vessel 106. For instance, when the nutrient solution 104 reaches the specified maximum height of the first growth vessel 106a, the excess nutrient solution 104 starts to flow via the overflow tube 120, which is arranged at the said maximum height in the first growth vessel 106a, to the second growth vessel 106b. In this regard, it is seen that each vessel 106 functions as an overflow container for the other vessel 106 since only one of the water pump 112 or 114 is activated at a time. This provides a fail-proof mechanism in case a water pump 112 or 114 fails to turn off because the system 100 cannot flood since the overflowing nutrient solution 104 simply flows into the adjoining vessel 106 and then drains down the liquid tube 116 or 118 and back into the nutrient reservoir 102. Likewise, since only one of the water pumps 112 or 114 operates at a time, it is only necessary to fill the nutrient reservoir 102 with just enough nutrient solution 104 to satisfy the needs of one of the vessels 106 at a time. Therefore, even if the pumps 112 and 114 fail in which both operate at the same time, there is insufficient nutrient solution 104 to flood the system 100.

Figure 2:
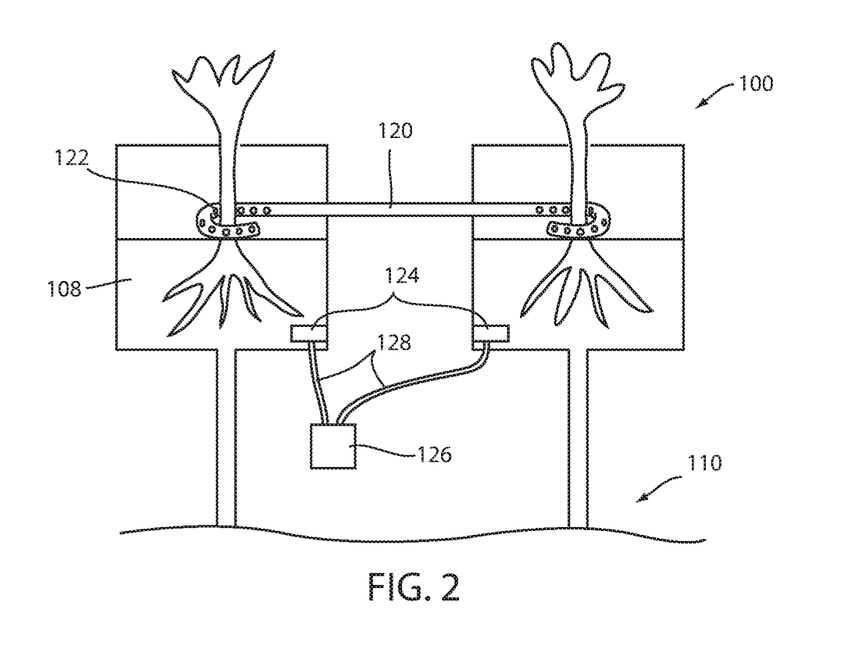
FIG. 2 is a schematic view of a hydroponic growth system of the present invention, in accordance with a second embodiment.

In an embodiment, as illustrated in FIG. 2, the overflow tube 120 extends into the second growth vessel 106b and includes a plurality of openings 122 for dispersing the nutrient solution 104 from the first growth vessel 106a. The plurality of openings 122 may be in the form of holes, slots, and the like. Further, as illustrated in the embodiment of FIG. 2, the overflow tube 120 can optionally extend partially around a trunk 12 of the plant 10 in the growth vessels 106. The overflow tube 120 can be curved (as shown in FIG. 2) to partially surround the trunk 12 of the plant 10 in the growth vessel, for example the second growth vessel 106b, thus allowing the plant 10 to be adequately watered from any overflown nutrient solution 104 from the adjacent growth vessel, i.e. the first growth vessel 106a, while also allowing the plant 10 to be removed from the second growth vessel 106b without having to disassemble the overflow tube 120 from the second growth vessel 106b.

In one or more embodiments, as also illustrated in FIG. 2, the hydroponic growth system 100 of the present disclosure can further optionally include an air stone 124 which may be positioned within at least one of the growth vessels 106. In the illustrated embodiment, the hydroponic growth system 100 is shown to include two air stones 124 for each of the two growth vessels 106a and 106b. The air stones 124, also sometimes called an aquarium bubbler, are utilized to gradually diffuse air into the growth vessels 106a and 106b. Generally, the utilized air stones 124 are pieces of limewood or porous stone, as traditionally used in the art. The hydroponic growth system 100 also includes an air pump 126, and air tubes 128 for delivering pumped air from the air pump 126 to the air stones 124. It may be understood that the pumped air helps with aeration and mixing of the nutrient solution 104 for the plants 10 in the growth vessels 106 to promote their growth.

Figure 3:
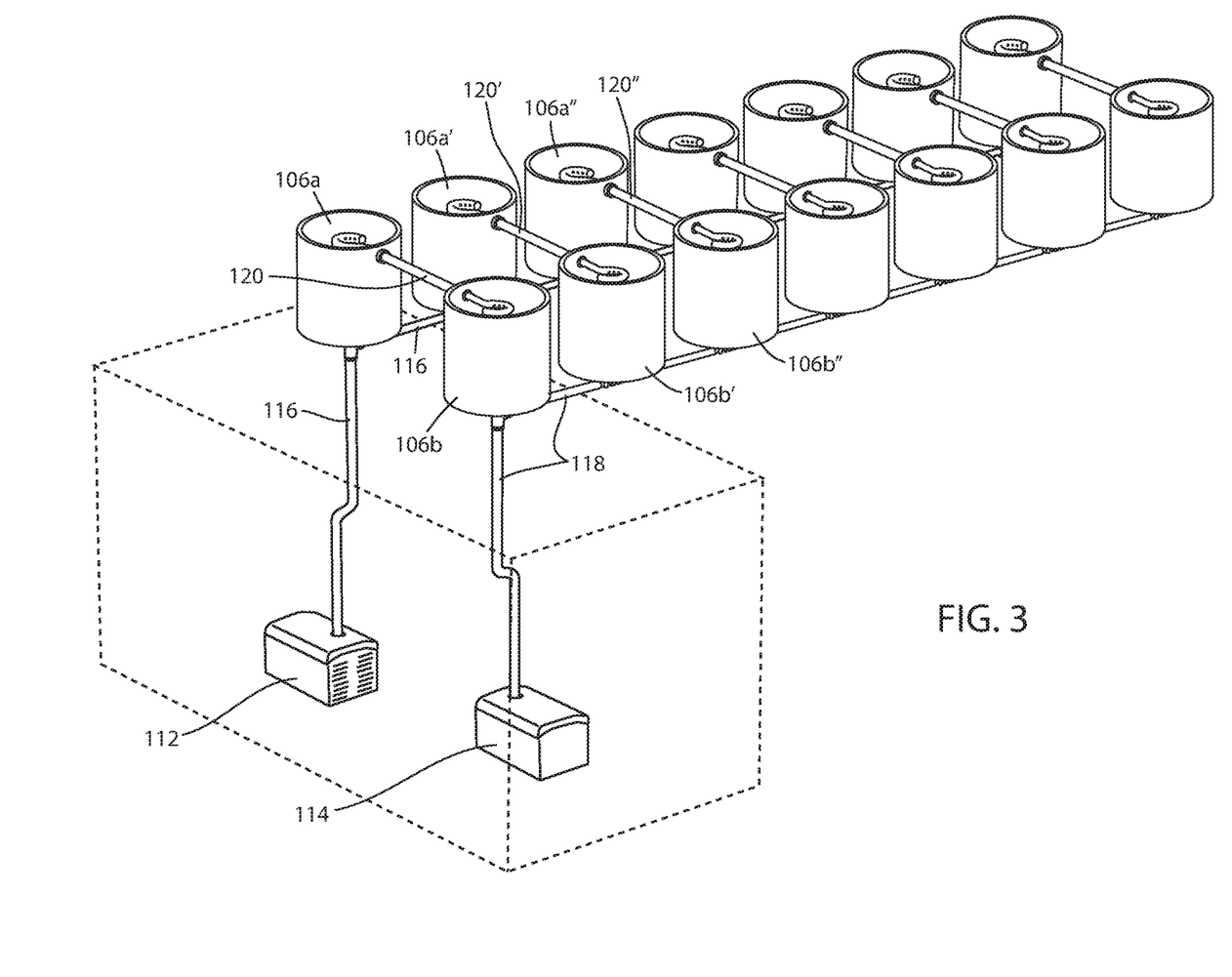
FIG. 3 is an alternate embodiment having seven pairs of growth vessels.

Optionally, and as shown in FIG. 3, the hydroponic growth system 100 can include multiple pairs of growth vessels 106a and 106b, such as shown as vessels 106a' and 106b', 106a" and 106b", and so forth. In this scenario, each additional pair of growth vessels, e.g., 106a' and 106b', are paired together with a respective overflow tube 120', 120", etc. as shown in FIG. 3. Furthermore, each additional pair of growth vessels is also plumbed in connection with the liquid tubes 116 and 118 as described hereinabove for growth vessels 106a and 106b. In total, FIG. 3 shows seven pairs of growth vessels, and water is delivered to each pair by the liquid tubes 116 and 118, and each growth vessel in a pair of growth vessels is connected to the other growth vessel by respective overflow tube 120. Assuming that the pumps 112 and 114 are appropriately sized and that the nutrient reservoir 102 contains sufficient nutrient solution 104, then theoretically additional pairs of growth vessels could be continuously added on.

Figure 4:
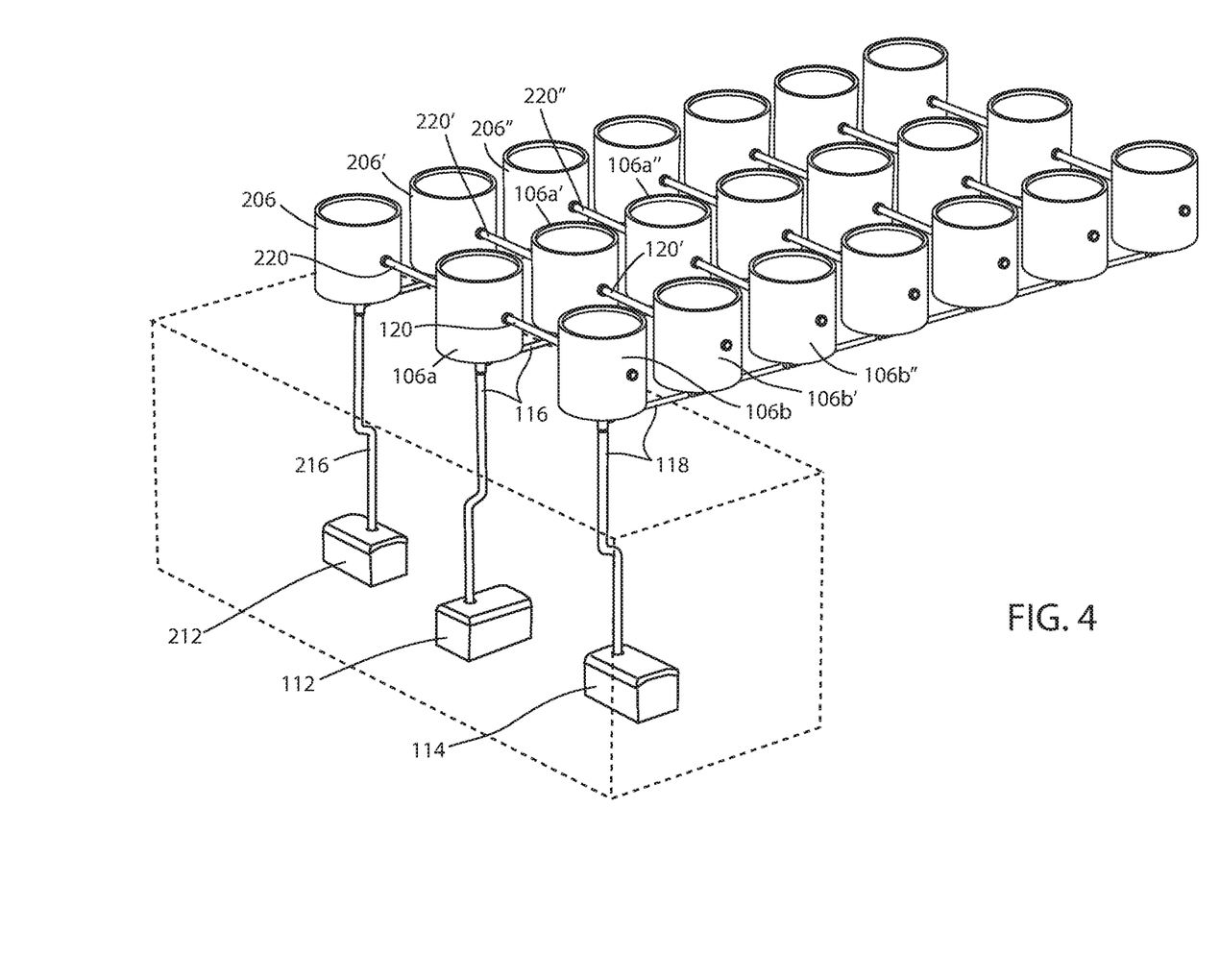
FIG. 4 is a top perspective view of a three-pump system.
Figure 5:
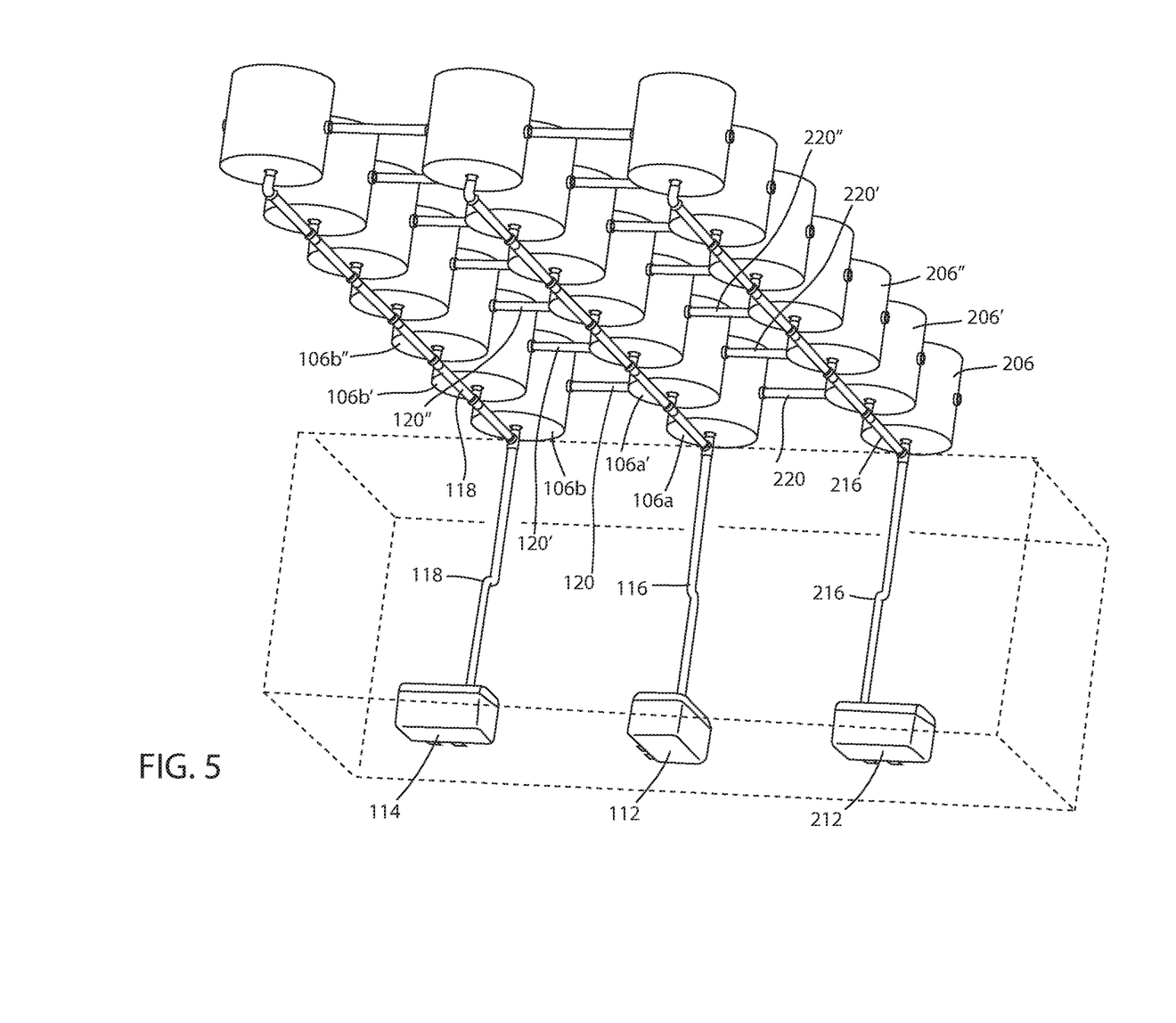
FIG. 5 is a bottom perspective view of a three-pump system.

According to yet another alternate embodiment, and as shown in FIGS. 4 and 5, there is provided a configuration of the hydroponic growth system 100 which includes three pumps, 112, 114, 212. This embodiment is similar to that shown and described in FIG. 3 in which multiple pair of growth vessels (106a, 106b, 106a', 106b') are provided. The third pump 212 is connected to a liquid tube 216 which is, in turn, connected to growth vessels 206, 206', 206", and so forth. And just as described above, growth vessel 206 is connected to growth vessel 106a via an overflow tube 220, the growth vessel 206' is connected to growth vessel 106a' via an overflow to 220', the growth vessel 206" is connected to growth vessel 106a" via an overflow to 220", and so forth.

Figure 6:
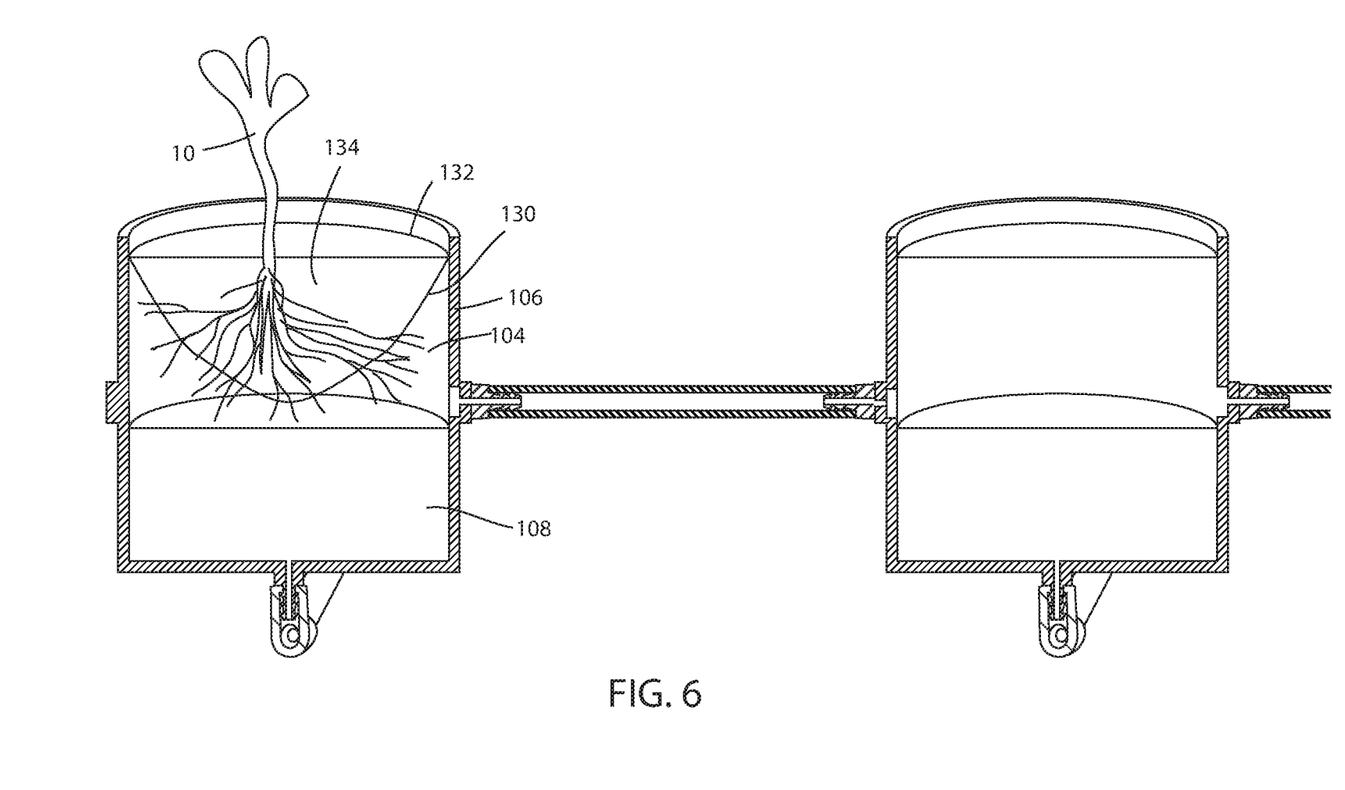
FIG. 6 is a sectional view of a growth vessel showing an alternate embodiment in which a second growth medium is contained within a water-permeable bag.

Shown in FIG. 6 is an alternate embodiment of an interior of the growth vessel 106. This embodiment includes the growth medium 108, similar to the embodiment described above. In this embodiment, the growth medium 108 only fills about one half or less of the growth vessel 106. The growth vessel includes a water-permeable bag 130 that has an upper edge 132 positioned proximate to an upper edge of the growth vessel 106, such that a central portion of the bag is suspended within the growth vessel 106. The bag 130 is filled with a volume of a second growth medium 134, which is preferably soil. In this embodiment, the plant 10 is rooted primarily in the second growth medium 134, and roots of the plant 10 stand out of the bag 130. The nutrient solution 104 periodically fills the growth vessel 106, during which time nutrients are delivered to the plant 10.

Figure 7:
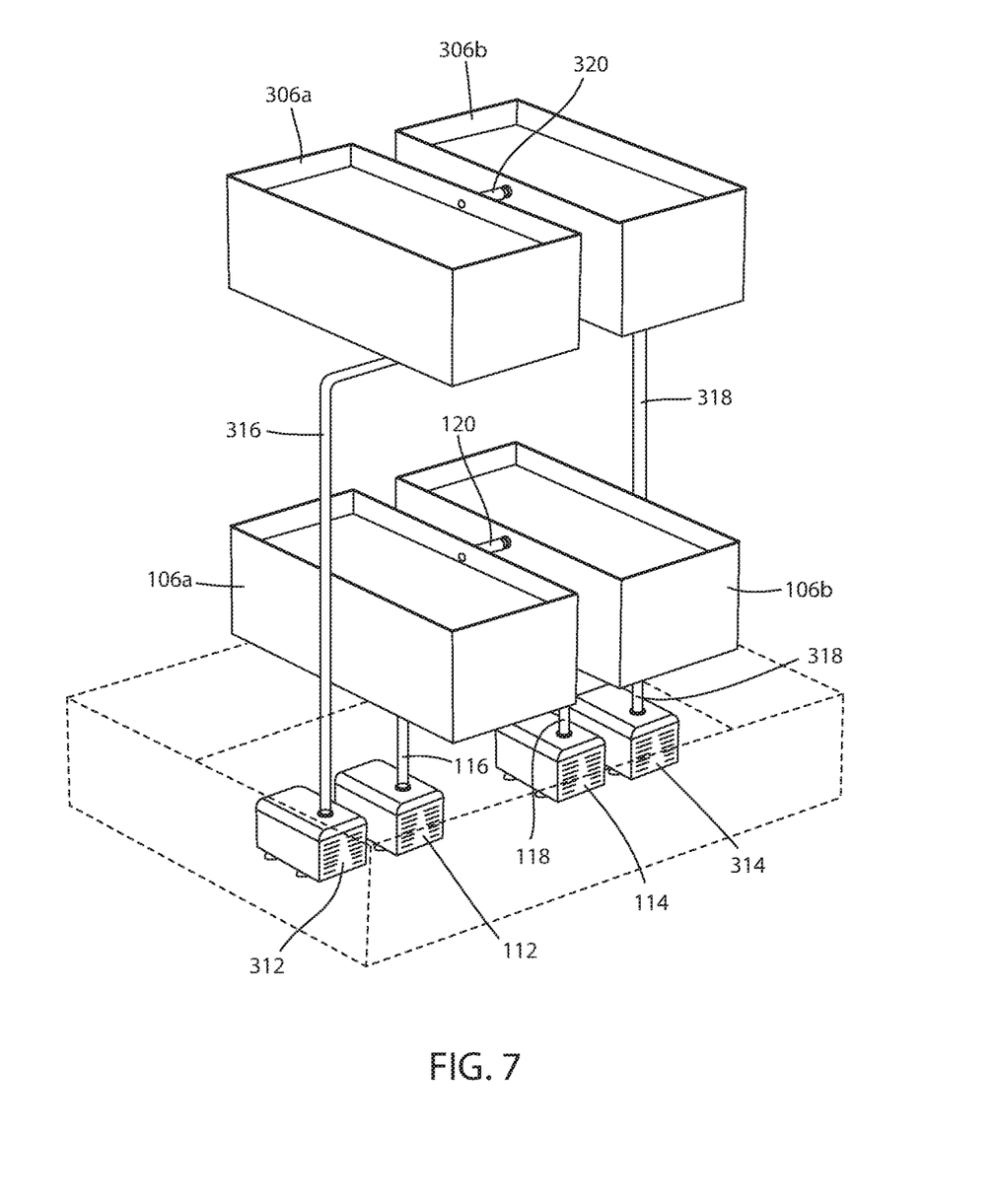
FIG. 7. is a top perspective view of an alternate embodiment having a two-tier growth system.
Figure 8:
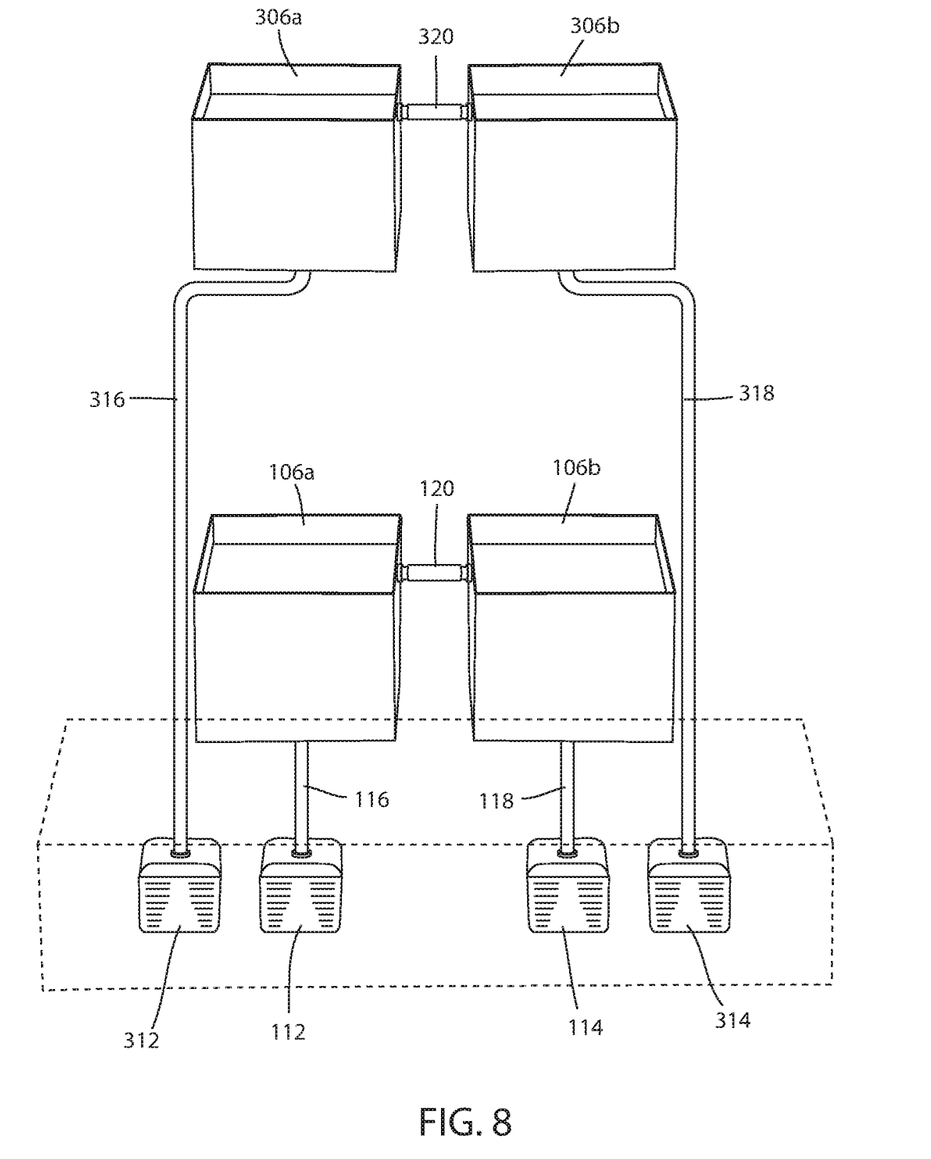
FIG. 8. is a front perspective view of an alternate embodiment having a two-tier growth system.

Turning to yet another embodiment shown in FIGS. 7 and 8, there is provided a two-tier version of the hydroponic growth system 100. This embodiment is fundamentally similar to the embodiment shown in FIG. 1, only that the growth vessels and associated liquid tubes and overflow tube are duplicated, and the duplicate being elevated. The duplicate includes growth vessels 306a and 306b, pumps 312 and 314, liquid tubes 316 and 318 and an overflow tube 320. The advantage to this multi-tiered growth system 100 is to greater utilize vertical space in an interior room, and to minimize the amount of ground space that is required, particularly for those embodiments shown in FIGS. 3-5.

Although not shown in the drawings, optionally the growth vessels 106a and 106b can be positioned adjacent one another, and the common wall between the vessels 106a and 106b can have a reduced height. The height of the common wall would be the same as the vertical position of the overflow tube 120. Thus, the overflow tube 120 is no longer needed and is replaced by the common wall having a lowered height. In this regard, nutrient solution 1041 in the growth vessel 106a can flow over the common wall when needed into growth vessel 106b, and vice versa.

Figure 9:
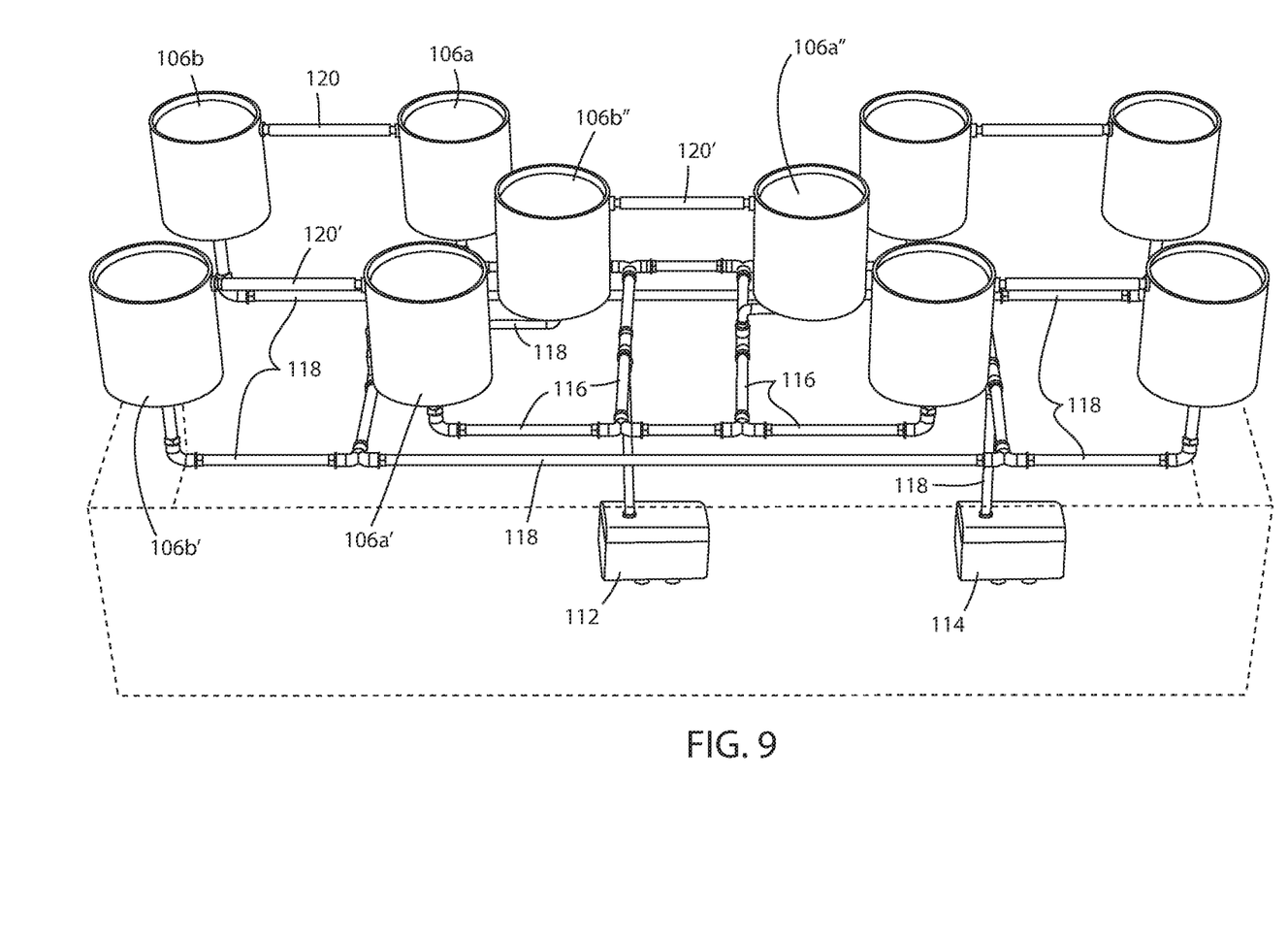
FIG. 9 is a top perspective view of an alternate arrange of the growth vessels.
Figure 10:
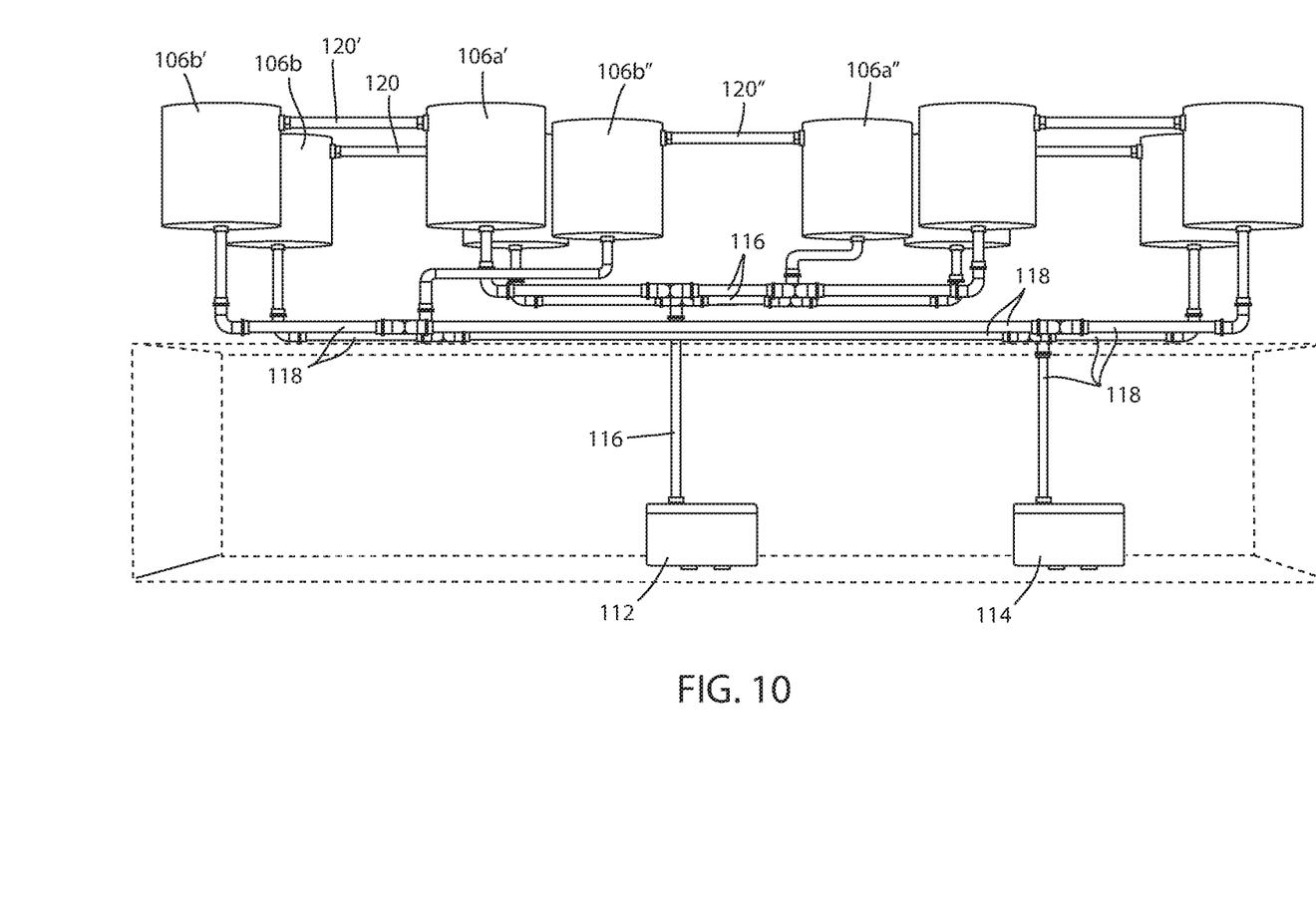
FIG. 10 is a bottom perspective view of an alternate arrangement of the growth vessels.

Referring now to FIGS. 9-10, there is shown an alternate arrangement of the growth vessels in the hydroponic growth system 100. The arrangement shown in FIGS. 9-10 includes five pairs of growth vessels 106. However, unlike the arrangement shown in FIG. 3 in which each pair of growth vessels 106 is lined up, the arrangement shown in FIGS. 9-10 has each pair of growth vessels 106 arranged in a different pattern.

According to the invention described above, a hydroponic growth system is provided. The market for hydroponic systems is growing in size and demand. The demand for these types of systems may further increase as land for farming decreases due to population growth. There is also a need to conserve water resources and minimize the number of separate pumping installations for multiple growing systems. The hydroponic growth system 100 of the present disclosure provides an efficient and cost-effective way of preventing overflow of the nutrient solution 104 therein without the need and implementation of complex control systems using multiple sensors, electronic controllers, and requirement of technicians for installation and maintenance of such complex control systems.

What is claimed is:

1. A hydroponic growth system comprising:
    a nutrient reservoir for containing a nutrient solution;
    a plurality of growth vessels comprising a first growth vessel and a second growth vessel, each of the first growth vessel and the second growth vessel having a bottom and at least one sidewall, wherein the at least one sidewall extends from the bottom thereof;
    a nutrient delivery system for delivering the nutrient solution from the nutrient reservoir to the first growth vessel and the second growth vessel, the nutrient delivery system comprising:
        at least one water pump;
        a first liquid tube being connected to and in fluid communication with the first growth vessel at a first liquid tube first end and further comprising a first liquid tube second end; and
        a second liquid tube being connected to and in fluid communication with the second growth vessel at a second liquid tube first end and further comprising a second liquid tube second end;
    whereby the at least one water pump is configured to pump the nutrient solution from the nutrient reservoir to the first growth vessel via the first liquid tube between the first liquid tube first and second ends or to the second growth vessel via the second liquid tube between the second liquid tube first and second ends; and
    an overflow tube extending between the first growth vessel and the second growth vessel and configured to provide fluid communication therebetween, wherein the overflow tube is secured to an upper portion of the sidewall of the first growth vessel and secured to an upper portion of the sidewall of the second growth vessel, such that the overflow tube extends laterally between the upper portion of the sidewall of the first growth vessel and the upper portion of the sidewall of the second growth vessel and is secured to the respective sidewall of each of the growth vessels at substantially the same elevation.

2. The hydroponic growth system of claim 1, wherein the overflow tube extends into the first growth vessel and the second growth vessel and includes a plurality of openings for dispersing the nutrient solution between the first growth vessel and the second growth vessel.

3. The hydroponic growth system of claim 1 further comprising an air stone positioned within at least one of the first growth vessel and the second growth vessel, an air pump, and an air tube for delivering pumped air from the air pump to the air stone.

4. The hydroponic growth system of claim 1 wherein at least one water pump is positioned within the nutrient reservoir.

5. The hydroponic growth system of claim 1, wherein the growth vessels contain a growth medium.

6. The hydroponic growth system of claim 5, wherein the growth medium is selected from the group consisting of: expanded clay pebbles, peat moss, coco coir (which is derived from coconut husks), gravel, rockwool, sand, perlite, vermiculite, diatomite, glass, hydropeat, and combinations thereof.

7. The hydroponic growth system of claim 1 wherein the at least one water pump comprises:
    a first water pump configured to pump the nutrient solution from the nutrient reservoir to the first growth vessel via the first liquid tube; and
    a second pump configured to pump the nutrient solution from the nutrient reservoir to the second growth vessel via the second liquid tube.

8. A hydroponic growth system comprising:
    a nutrient reservoir for containing a nutrient solution;
    a first growth vessel and a second growth vessel, each of the first growth vessel and the second growth vessel having a bottom and at least one sidewall, wherein the at least one sidewall extends from the bottom thereof;
    a nutrient delivery system for delivering the nutrient solution from the nutrient reservoir to the first growth vessel and the second growth vessel, the nutrient delivery system including at least one water pump and a respective liquid tube, and each provided liquid tube being connected to and in fluid communication with a respective growth vessel at a first end, and being connected to and in fluid communication with the at least one water pump at a second end, whereby the at least one water pump is configured to pump the nutrient solution from the nutrient reservoir to the first growth vessel or the second growth vessel via the respective liquid tube; and
    an overflow tube extending between the first growth vessel and the second growth vessel and configured to provide fluid communication therebetween, wherein the overflow tube is secured to an upper portion of the sidewall of the first growth vessel and secured to an upper portion of the sidewall of the second growth vessel, such that the overflow tube extends laterally between the upper portion of the sidewall of the first growth vessel and the upper portion of the sidewall of the second growth vessel; and
    wherein the overflow tube extends into the first growth vessel and terminates at a first curved end portion and extends into the second growth vessel and terminates at a second curved end portion, wherein the first and second curved end portions each include a plurality of openings for dispersing the nutrient solution between the first growth vessel and the second growth vessel.

9. The hydroponic growth system of claim 8 further comprising an air stone positioned within at least one of the first growth vessel and the second growth vessel, an air pump, and an air tube for delivering pumped air from the air pump to the air stone; and wherein the at least one water pump is positioned within the nutrient reservoir.

10. The hydroponic growth system of claim 9 wherein the at least one water pump comprises:
  a first water pump configured to pump the nutrient solution from the nutrient reservoir to the first growth vessel via a first liquid tube, wherein the first liquid tube is connected to and in fluid communication with the first growth vessel at a first liquid tube first end and the first water pump at a first liquid tube second end; and
  a second water pump configured to pump the nutrient solution from the nutrient reservoir to the second growth vessel via a second liquid tube, wherein the second liquid tube is connected to and in fluid communication with the second growth vessel at a second liquid tube first end and the second water pump at a second liquid tube second end.

11. The hydroponic growth system of claim 10, wherein the first growth vessel and the second growth vessel each contain a growth medium; and wherein the growth medium is selected from the group consisting of: expanded clay pebbles, peat moss, coco coir (which is derived from coconut husks), gravel, rockwool, sand, perlite, vermiculite, diatomite, glass, hydropeat, and combinations thereof.

12. The hydroponic growth system of claim 1 wherein the overflow tube extends between the sidewall of the first growth vessel and the sidewall of the second growth vessel in an orientation that is substantially parallel with each of the bottom of the first growth vessel and the bottom of the second growth vessel.

13. The hydroponic growth system of claim 8 wherein the overflow tube extends between the upper portion of the sidewall of the first growth vessel and the upper portion of the sidewall of the second growth vessel and is secured to the respective sidewall of each of the first growth vessel and the second growth vessel at substantially the same elevation.

14. The hydroponic growth system of claim 13 wherein the overflow tube extends between the sidewall of the first growth vessel and the sidewall of the second growth vessel in an orientation that is substantially parallel with each of the bottom of the first growth vessel and the bottom of the second growth vessel.

15. A hydroponic growth system comprising:
  a nutrient reservoir for containing a nutrient solution;
  a plurality of growth vessels comprising at least a first growth vessel and a second growth vessel, each of the first growth vessel and the second growth vessel having a bottom and at least one sidewall, wherein the at least one sidewall extends from the bottom thereof;
  a nutrient delivery system for delivering the nutrient solution from the nutrient reservoir to the first growth vessel and the second growth vessel, the nutrient delivery system including:
    a first water pump and a second water pump;
    a first liquid tube being connected to and in fluid communication with the first growth vessel at a first liquid tube first end and the first water pump at a first liquid tube second end, wherein the first water pump is configured to pump the nutrient solution from the nutrient reservoir to the first growth vessel via the first liquid tube; and
    a second liquid tube being connected to and in fluid communication with the second growth vessel at a second liquid tube first end and the second water pump at a second liquid tube second end, wherein the second water pump is configured to pump the nutrient solution from the nutrient reservoir to the second growth vessel via the second liquid tube; and
  an overflow tube extending between the first growth vessel and the second growth vessel and configured to provide fluid communication therebetween, wherein the overflow tube is secured to an upper portion of the sidewall of the first growth vessel and secured to an upper portion of the sidewall of the second growth vessel, and wherein the overflow tube is secured to the sidewall of the first growth vessel and to the sidewall of the second growth vessel at substantially the same elevation.

16. The hydroponic growth system of claim 15 wherein the first water pump and the second water pump are configured to not run simultaneously.

17. The hydroponic growth system of claim 16 wherein the first growth vessel is disposed laterally adjacent to the second growth vessel; and
  wherein the overflow tube extends between the sidewall of the first growth vessel and the sidewall of the second growth vessel in an orientation that is substantially parallel with each of the bottom of the first growth vessel and the bottom of the second growth vessel.

18. The hydroponic growth system of claim 17 wherein the overflow tube extends into the first growth vessel and terminates at a first curved end portion and extends into the second growth vessel and terminates at a second curved end portion, wherein the first and second curved end portions each define a plurality of openings for dispersing the nutrient solution between the first growth vessel and the second growth vessel.

19. The hydroponic growth system of claim 18 further comprising an air stone positioned within at least one of the first growth vessel and the second growth vessel, an air pump, and an air tube for delivering pumped air from the air pump to the air stone.

20. The hydroponic growth system of claim 19, wherein the first growth vessel and the second growth vessel each contain a growth medium, wherein the growth medium is selected from the group consisting of: expanded clay pebbles, peat moss, coco coir (which is derived from coconut husks), gravel, rockwool, sand, perlite, vermiculite, diatomite, glass, hydropeat, and combinations thereof.

* * * * *